(12) United States Patent
Nakamura

(10) Patent No.: US 8,945,290 B2
(45) Date of Patent: Feb. 3, 2015

(54) MULTI-CYCLONE COLLECTOR

(71) Applicant: Horkos Corporation, Hiroshima (JP)

(72) Inventor: Yusuke Nakamura, Hiroshima (JP)

(73) Assignee: Horkos Corp., Hiroshima (JP)

( * ) Notice: Subject to any disclaimer, the term of this patent is extended or adjusted under 35 U.S.C. 154(b) by 0 days.

(21) Appl. No.: 14/127,109

(22) PCT Filed: Sep. 20, 2013

(86) PCT No.: PCT/JP2013/005549
§ 371 (c)(1),
(2) Date: Dec. 17, 2013

(87) PCT Pub. No.: WO2014/061201
PCT Pub. Date: Apr. 24, 2014

(65) Prior Publication Data
US 2014/0305311 A1    Oct. 16, 2014

(30) Foreign Application Priority Data

Oct. 15, 2012  (JP) .................................. 2012-228480

(51) Int. Cl.
*B01D 45/18* (2006.01)
*B04C 5/14* (2006.01)
*B04C 5/28* (2006.01)
*B04C 5/23* (2006.01)

(52) U.S. Cl.
CPC ... *B04C 5/14* (2013.01); *B04C 5/28* (2013.01); *B04C 5/23* (2013.01)
USPC ........ 96/228; 96/414; 96/423; 95/24; 95/271; 55/346; 55/347; 55/348; 55/424; 55/429; 55/459.1

(58) Field of Classification Search
USPC ........... 55/346, 347, 348; 96/414–423; 95/24, 95/271
See application file for complete search history.

(56) References Cited

U.S. PATENT DOCUMENTS

2010/0258008 A1 * 10/2010 Cheng ............................. 96/190

FOREIGN PATENT DOCUMENTS

| JP | 2004-322086 A | 11/2004 |
|---|---|---|
| JP | 2007-098339 A | 4/2007 |
| JP | 2007-111662 A | 5/2007 |
| JP | 2007-144367 A | 6/2007 |
| JP | 2010-158634 A | 7/2010 |
| JP | 2011-011109 A | 1/2011 |

\* cited by examiner

*Primary Examiner* — Dung H Bui
(74) *Attorney, Agent, or Firm* — Osha Liang LLP

(57) ABSTRACT

A multi-cyclone collector includes a suction port for sucking an air flow including contaminating particles, a cyclone accommodation chamber allowing the air flow sucked through the suction port to be guided thereinto, a plurality of cyclones each accommodated in the cyclone accommodation chamber, for transforming the air flow taken in to a downward swirl flow, separating the contaminating particles, then reversing the swirl flow to the upward swirl flow and releasing the upward swirl flow as a purified air flow, a cyclone exit chamber provided above the cyclone accommodation chamber, that allows the purified air flow from the cyclones to be guided thereinto, and a drain discharge chamber provided below the cyclone accommodation chamber, for collecting the contaminating particles separated by the cyclones.

13 Claims, 21 Drawing Sheets

FIG. 4A
FIG. 4B
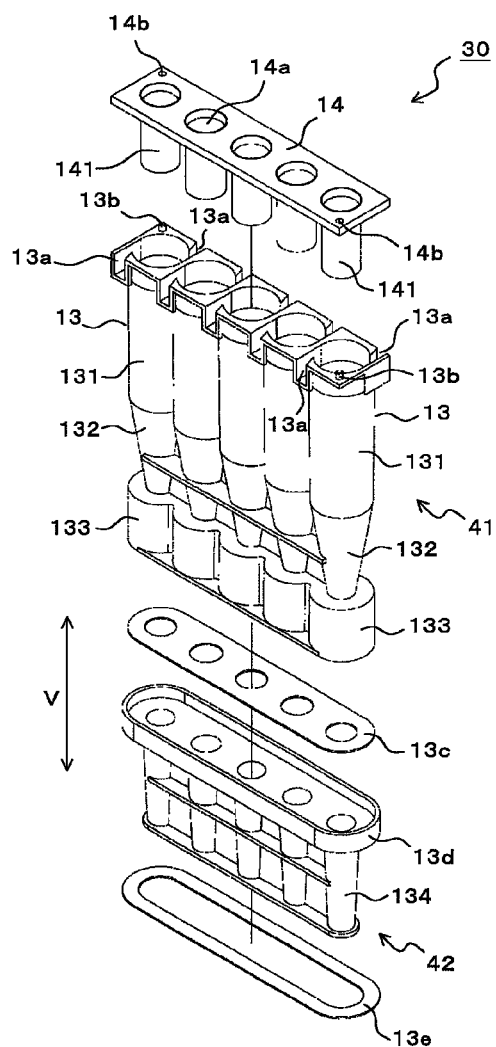
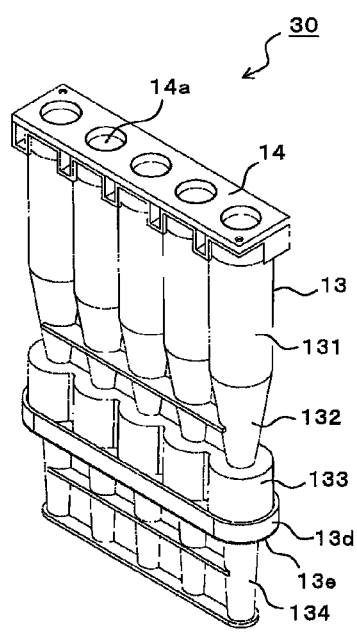

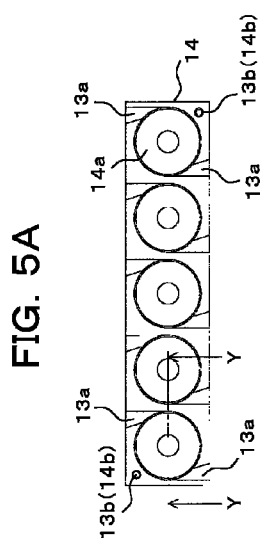
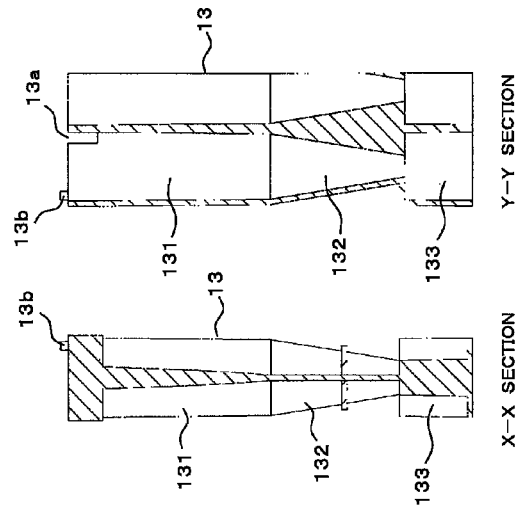
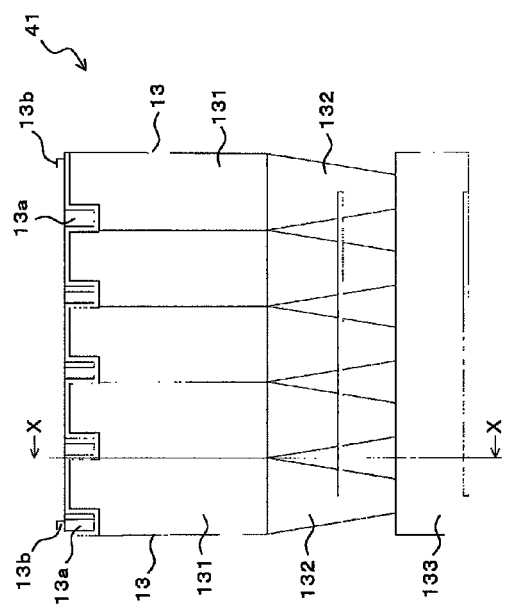

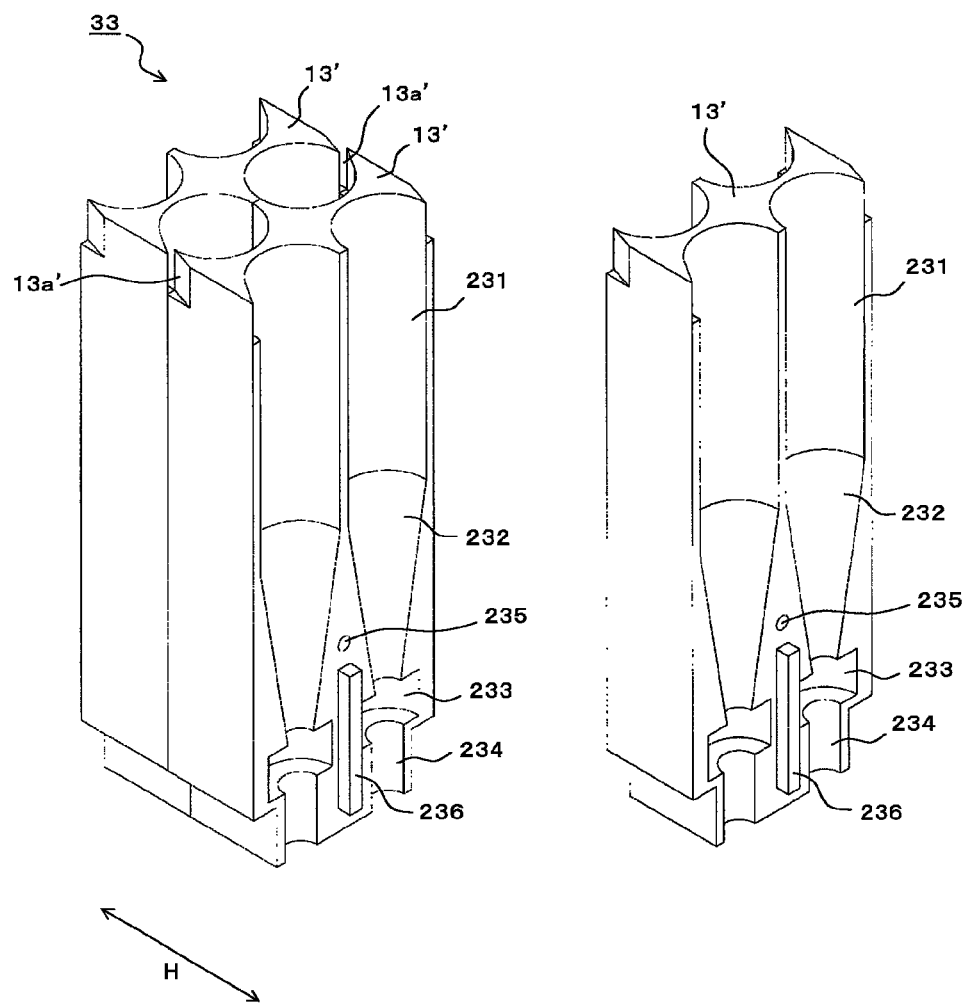

FIG. 15A
FIG. 15B
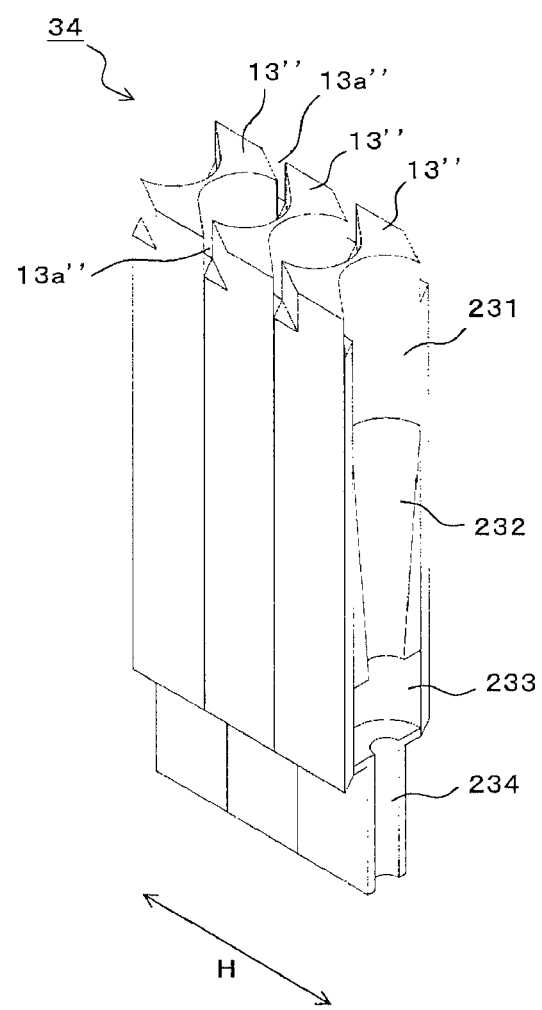
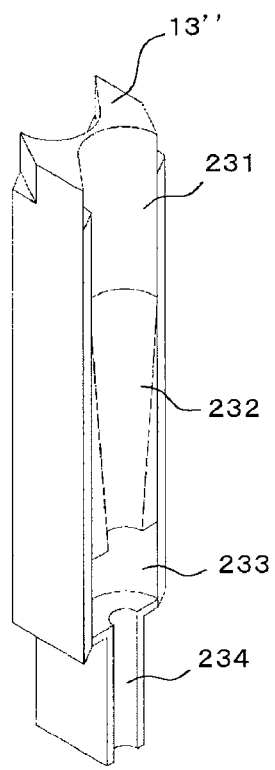

MULTI-CYCLONE COLLECTOR

CROSS-REFERENCE TO RELATED APPLICATIONS

This application is a National Stage application of International Patent Application No. PCT/JP2013/005549, filed on Sep. 20, 2013, which claims priority pursuant to 35 U.S.C. §119(a) to Japanese Patent Application No. 2012-228480, filed on Oct. 15, 2012. Both priority applications are hereby incorporated by reference in their entirety.

BACKGROUND OF THE INVENTION

1. Field of the Invention

One or more embodiments of the present invention relates to an apparatus for collecting contaminating particles included in an air flow with a plurality of cyclones, and particularly relates to a multi-cyclone collector suitable for separating and collecting oil mist generated during processing of a machine tool.

2. Background Art

Conventional collectors for separating and collecting oil mist include filter apparatuses for filtrating with nonwoven fabric. However, the nonwoven fabric causes clogging and its processable air volume is reduced gradually in the course of time. Maintenance or replacement of the nonwoven fabric is thus required uneconomically. In view of this, collectors commercially available in recent years are so-called filterless collectors for separating and collecting oil mist not by filtration but with inertial force, centrifugal force, or the like. However, many of these collectors fail in highly accurate separation and exert insufficient collection performance. Therefore, improvement in performance of the filterless collectors is urgently needed for better economic efficiency and work environment.

A cyclone is one of devices that are capable of separating contaminating particles such as dust and oil mist with high accuracy. As schematically shown in FIG. 20, the cyclone transforms a contaminated air flow taken therein to a swirl flow, applies centrifugal force to contaminating particles in the air flow, separates the contaminating particles from the air flow with the centrifugal force, and releases a purified air flow including no contaminating particles. The cyclone of this type has larger centrifugal force as the swirl flow has a smaller swirl radius (cyclone radius). This leads to decrease in separable particle diameter (so-called separation limit particle diameter) and enables highly accurate separation.

The filterless collectors also adopt cyclones. However, a conventional cyclone has a large cyclone radius and low separation accuracy, and is thus utilized as preprocessing devices. The collector needs to include, after the cyclone, a collection mechanism such as a filter having a finer structure. In this case, there arise disadvantages such as clogging and large pressure loss (see Patent Literatures 1 to 3, for example).

A cyclone is restricted due to so-called similarity in design, and decrease in cyclone radius inevitably leads to decrease in size of an inlet port for an air flow. Consequently, if the air flow has constant speed, processable air volume is decreased. In view of this, there has been known a multi-cyclone collector including a plurality of cyclones aligned in parallel so as to achieve necessary air volume even with a small cyclone radius (see Patent Literatures 4 to 6, for example).

CITATION LIST

Patent Literatures

Patent Literature 1: JP 2011-11109 A
Patent Literature 2: JP 2010-158634 A
Patent Literature 3: JP 2007-144367 A
Patent Literature 4: JP 2004-322086 A
Patent Literature 5: JP 2007-98339 A
Patent Literature 6: JP 2007-111662 A The multi-cyclone collector advantageously keeps accuracy in separation of contaminating particles and achieves sufficient processed air volume. Meanwhile, as indicated by a broken line in FIG. 21, part of contaminating particles separated by a cyclone A flow to reach below another cyclone B and is discharged along a swirl flow in the cyclone B. This is called rescattering and deteriorates efficiency of collecting contaminating particles in the entire cyclones. Furthermore, as indicated by a dashed line in FIG. 21, when the cyclones A and B are unbalanced in terms of the air flow, pressure, and the like, part of the air flow of the cyclone A travels to reach below the cyclone B so as to cause an upward air flow below the cyclone B. This leads to remarkable deterioration in collection performance of the cyclone B and deterioration in efficiency of collecting contaminating particles in the entire cyclones.

Accordingly, in a conventional multi-cyclone collector including cyclones each of which exerts high separation accuracy, it is difficult to keep such high separation accuracy and collection efficiency of each of the cyclones although sufficient processed air volume is achieved with plurality of cyclones. The multi-cyclone collector is thus limited in terms of improvement in performance. If contaminating particles are highly adhesive, reduction in cyclone radius may cause clogging of an air flow path with adhering contaminating particles. Furthermore, the contaminating particles receive powerful centrifugal force. Therefore, if the contaminating particles contain a highly abrasive substance, the inner wall of each of the cyclones may be abraded partially.

SUMMARY OF THE INVENTION

One or more embodiments of the present invention provide a multi-cyclone collector that keeps high separation accuracy and collection efficiency of each cyclone, achieves sufficient processed air volume, and prevents rescattering of contaminating particles so as to achieve high collection efficiency. One or more embodiments of the present invention also provide a multi-cyclone collector that facilitates maintenance, replacement, and cleaning of the cyclone.

A multi-cyclone collector according to the one or more embodiments of the present invention includes: a suction port for sucking an air flow including contaminating particles; a cyclone accommodation chamber allowing the air flow sucked through the suction port to be guided thereinto; a plurality of cyclones each accommodated in the cyclone accommodation chamber, for transforming the air flow taken in to a downward swirl flow, separating the contaminating particles, then reversing the swirl flow to the upward swirl flow and releasing the upward swirl flow as a purified air flow; a cyclone exit chamber provided above the cyclone accommodation chamber, that allows the purified air flow from the cyclones to be guided thereinto; and a drain discharge chamber provided below the cyclone accommodation chamber, for collecting the contaminating particles separated by the cyclones.

Each of the cyclones has a swirling portion allowing the downward swirl flow to travel therethrough, a reversing portion for reversing the swirl flow to the upward swirl flow, and a discharge pipe for guiding the contaminating particles separated from the air flow into the drain discharge chamber. The discharge pipe has a lower opening sealed by liquid stored in the drain discharge chamber. The multi-cyclone collector further includes a liquid level control means for controlling liquid level of the liquid so that the liquid in the discharge pipe does not reach the reversing portion.

In this configuration, the lower opening of the discharge pipe is sealed with the liquid. Therefore, even when the cyclones are aligned together, an unintended flow as indicated in FIG. 21 is not caused and the contaminating particles will not rescatter. Accordingly, alignment of a large number of cyclones each having a small cyclone radius keeps high separation accuracy and collection efficiency of each of the cyclones, as well as achieves sufficient processed air volume and prevents rescattering of the contaminating particles so as to achieve high collection efficiency.

Furthermore, the liquid level control means controls so that the liquid in the discharge pipe does not reach the reversing portion regardless of difference in pressure between the inside of the cyclone and the drain discharge chamber. The discharge pipe thus does not need to be increased in length, and the apparatus can be minimized in height and be reduced in size.

According to one or more embodiments of the present invention, the liquid level control means is a communication pipe connecting the cyclone exit chamber and the drain discharge chamber.

According to one or more embodiments of the present invention, the drain discharge chamber is provided with a wall blocking the liquid until the liquid overflows, and a discharge port for discharging the liquid overflown the wall.

According to one or more embodiments of the present invention, the plurality of cyclones configure a cyclone unit that is an aggregate of the cyclones and is dividable, and the cyclone accommodation chamber accommodates a predetermined number of the cyclone units. In this case, the cyclone units can be each dividable in a vertical direction or in a horizontal direction.

According to one or more embodiments of the present invention, the multi-cyclone collector further includes a cleaning means for supplying the cyclone accommodation chamber with cleaning solution and cleaning the cyclones. The cleaning means includes, for example, a cleaning nozzle, and jets the cleaning solution from the cleaning nozzle toward the cyclone accommodation chamber to clean the cyclones. Alternatively, the cleaning means can inject the cleaning solution into the cyclone accommodation chamber and fill the cyclone accommodation chamber with the cleaning solution to clean the cyclones.

One or more embodiments of the present invention enables provision of a multi-cyclone collector that does not rescatter contaminating particles and achieves high accuracy, sufficient air volume, and high collection efficiency.

BRIEF DESCRIPTION OF DRAWINGS

FIGS. 4A and 4B are perspective views of a cyclone unit according to one or more embodiments of the present invention;

FIGS. 5A to 5D are a top view, a side view, and sectional views of the cyclone unit, respectively according to one or more embodiments of the present invention;

FIGS. 14A and 14B are perspective views of a cyclone unit according to one or more embodiments of the present invention;

FIGS. 15A and 15B are perspective views of a cyclone unit according to one or more embodiments of the present invention;

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention. Embodiments of the present invention will be described hereinafter with reference to the drawings. In the respective drawings, identical portions or corresponding portions are denoted by identical reference signs. Exemplified herein is a multi-cyclone collector (hereinafter, referred to as an "oil mist collector") for collecting oil mist generated during processing of a machine tool.

Figure 1:
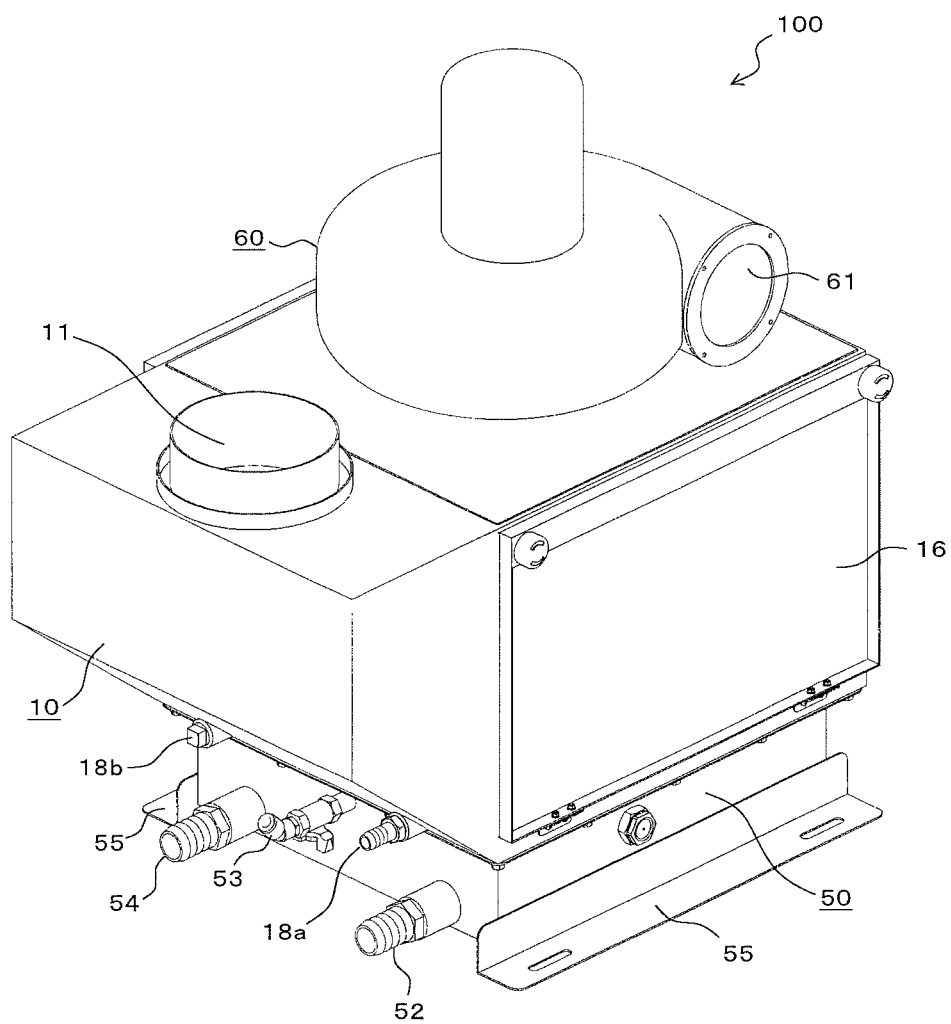
FIG. 1 is an outer appearance view of an oil mist collector (multi-cyclone collector) according to one or more embodiments of the present invention.
Figure 2:
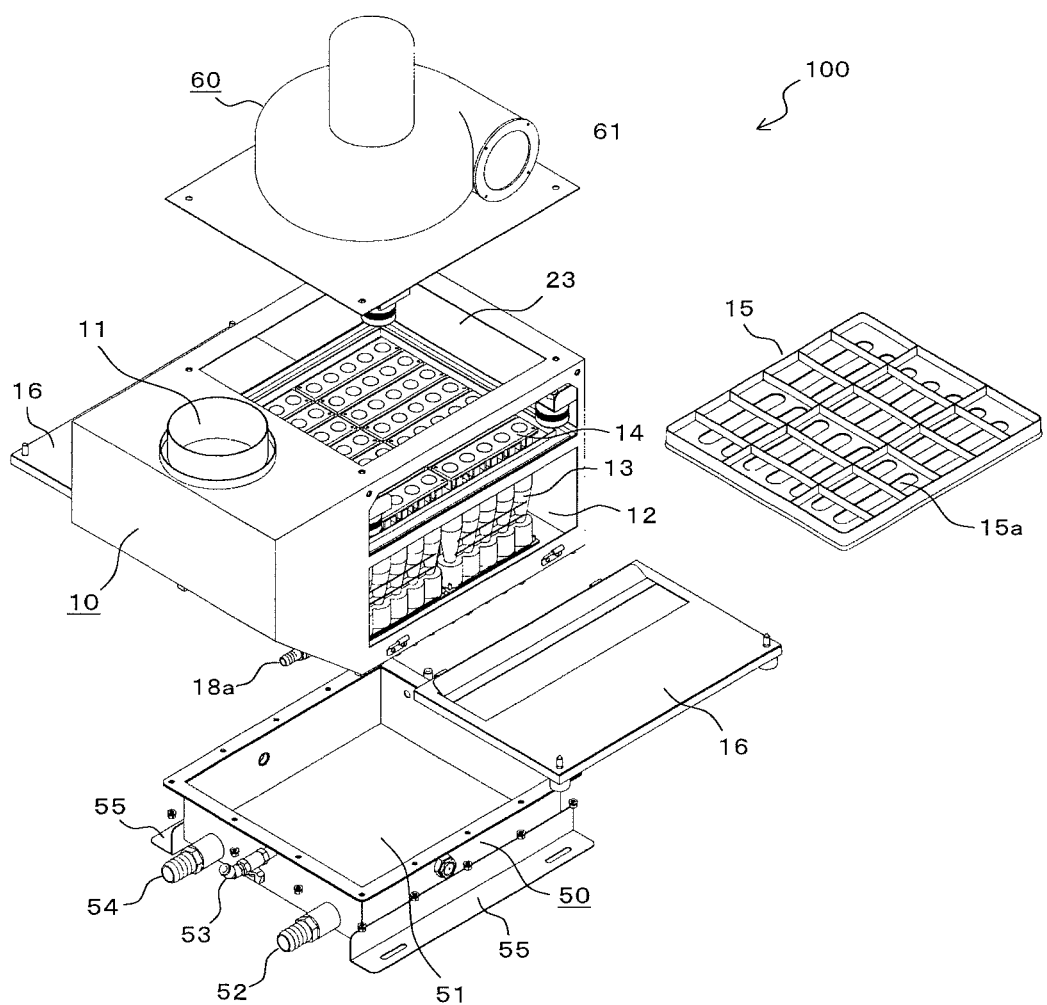
FIG. 2 is an exploded perspective view of the oil mist collector depicted in FIG. 1 according to one or more embodiments of the present invention.

An entire structure of the oil mist collector according to one or more embodiments is initially described with reference to FIGS. 1 to 3. As shown in FIGS. 1 and 2, an oil mist collector 100 includes a main body 10, a collection tray 50, and an exhaust unit 60.

Figure 3:
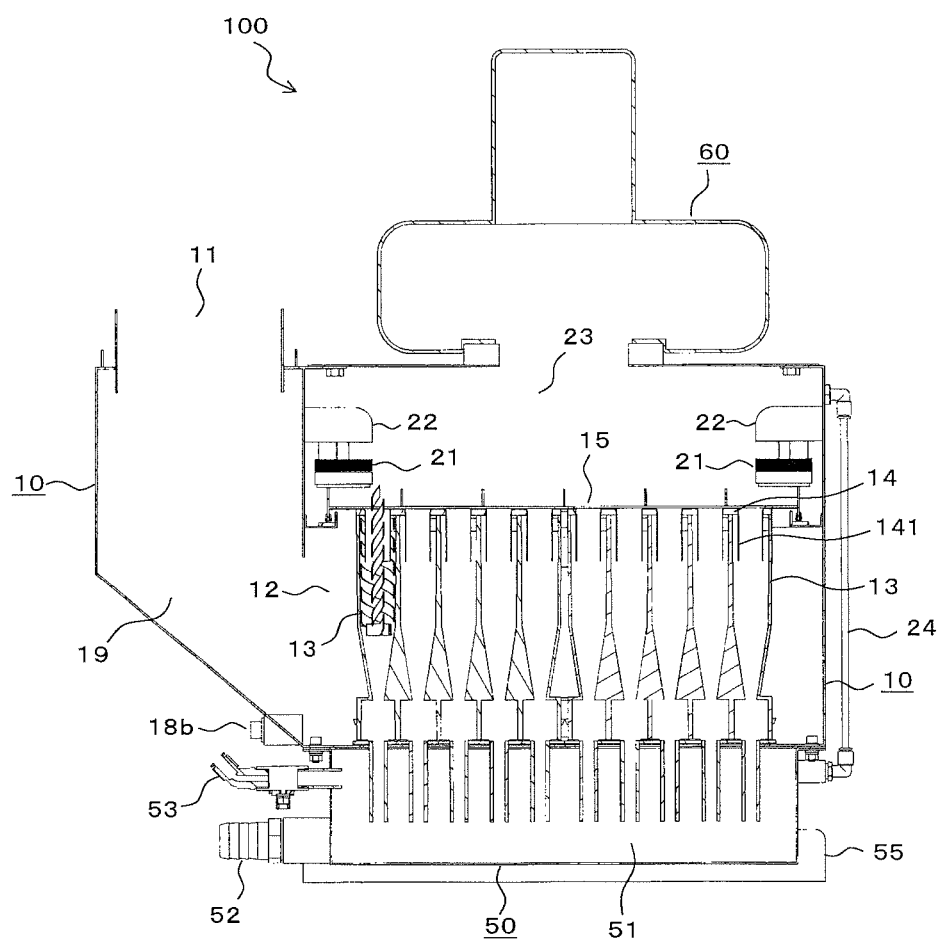
FIG. 3 is a side sectional view of the oil mist collector depicted in FIG. 1 according to one or more embodiments of the present invention.

As shown in FIG. 3, the main body 10 has a suction port 11, an air flow inlet portion 19, a cyclone accommodation chamber 12, and a cyclone exit chamber 23. As shown in FIGS. 1 and 2, the main body 10 is also provided with side plates 16. The side plates 16 are openably attached so as to cover sides of the cyclone accommodation chamber 12 and the cyclone exit chamber 23. It is possible to replace a cyclone unit, which is to be described later, by opening the side plate 16. The main body 10 is further provided with discharge ports 18a and 18b used for discharging liquid in the cyclone accommodation chamber 12 (see FIG. 1).

The suction port 11 sucks an air flow including oil mist generated during processing of a machine tool. The air flow inlet portion 19 guides the air flow sucked through the suction port 11 into the cyclone accommodation chamber 12. The cyclone accommodation chamber 12 accommodates a plurality of cyclones 13. The cyclones 13 are of a reversal type, each take in the air flow guided into the cyclone accommodation chamber 12, generate a downward swirl flow, separate the oil mist in the air flow with centrifugal force, and reverse the swirl flow to the upward flow so as to release the upward flow as a purified air flow. The cyclones 13 are to be described in detail later.

As shown in FIGS. 2 and 3, the cyclones 13 have upper ends to which an exit pipe holder 14 holding exit pipes 141 (see FIG. 3) is mounted. The exit pipe holder 14 has an upper surface on which a keep plate 15 having through holes 15a (see FIG. 2) is placed. As shown in FIG. 3, the keep plate 15 is fixed with fixtures 21 provided to brackets 22. In this state, the exit pipes 141 of the exit pipe holder 14 are positioned just below the through holes 15a in the keep plate 15. The cyclones 13 are thus in communication with the cyclone exit chamber 23 by way of the exit pipes 141 and the through holes 15a.

As shown in FIG. 3, the cyclone exit chamber 23 is provided above the cyclone accommodation chamber 12, and is in communication with the exhaust unit 60 that is located above the main body 10. The exhaust unit 60 is provided therein with a fan (not shown). When the fan rotates, the purified air flow released from the cyclones 13 is guided through the cyclone exit chamber 23 into the exhaust unit 60, and is released to the outside through an exhaust port 61 (see FIG. 1).

As shown in FIG. 2, the collection tray 50 is a box with an open upper side, and has an inner portion serving as a drain discharge chamber 51 into which the oil mist separated by the cyclones 13 is discharged. As shown in FIG. 3, the drain discharge chamber 51 is in communication with the cyclone exit chamber 23 by way of a communication pipe 24. As to be described later, the drain discharge chamber 51 stores liquid used for taking discharged oil mist therein. The communication pipe 24 and the drain discharge chamber 51 are connected to each other at a position higher than the liquid surface of the liquid in the drain discharge chamber 51 (see FIG. 8). The communication pipe 24 reduces difference in pressure between the inside of the cyclones 13 and the drain discharge chamber 51. The collection tray 50 has a side wall provided with discharge ports 52 and 54 used for discharging liquid in the drain discharge chamber 51 and an injection port 53 used for injecting liquid into the drain discharge chamber 51. The collection tray 50 has other facing side walls provided with L-shaped brackets 55 attaching the oil mist collector 100 to a machine tool.

Next, the cyclones 13 are described in detail. As shown in FIGS. 4A and 4B, according to one or more embodiments, the plurality of cyclones 13 configure cyclone units 30 as aggregates of the respective cyclones. In this case, the cyclone units 30 each include five cyclones 13. This is merely an example, and the number of cyclones included in one unit can be selected as appropriate. The cyclone units 30 are made of resin, and can be alternatively made of metal.

As shown in FIG. 4A, the cyclone unit 30 can be divided in a vertical direction V. More specifically, the cyclone unit 30 includes the exit pipe holder 14 holding the exit pipes 141, a first block 41 where portions other than discharge pipes of the plurality of cyclones 13 are coupled integrally, a second block 42 where the discharge pipes of the plurality of cyclones 13 are coupled integrally, a sealing member 13c interposed between the blocks 41 and 42, and a sealing member 13e attached to the second block 42. These components can be divided in the vertical direction V.

The exit pipe holder 14 is provided with openings 14a at positions corresponding to the exit pipes 141, and is also provided, at its two corners, with holes 14b. The first block 41 is provided, at its top, with projections 13b to be fitted into the holes 14b in the exit pipe holder 14. The exit pipe holder 14 is fixed to the first block 41 by inserting the exit pipes 141 into the cyclones 13 and fitting the projections 13b into the holes 14b, respectively.

The cyclones 13 in the first block 41 each include an inlet port 13a, a swirling portion 131, a reversing portion 132, and a chamber portion 133. The inlet port 13a is provided at the top of the cyclone 13 so as to take an air flow guided to the cyclone accommodation chamber 12 in the cyclone 13. According to one or more embodiments, the cyclones 13 each have two inlet ports 13a.

The swirling portion 131 has a cylindrical shape and has an inner portion in which the air flow taken in through each of the inlet ports 13a travels as a downward swirl flow. The reversing portion 132 has a funnel shape and reverses the downward swirl flow generated at the swirling portion 131 to the upward swirl flow. The chamber portion 133 provides an enlarged space allowing oil mist separated from a swirl flow to be smoothly guided to discharge pipes 134 without being caught by an air flow at the reversing portion 132.

The second block 42 includes a discharge pipe holder 13d and the discharge pipes 134 held by the discharge pipe holder 13d. The second block 42 is coupled to the first block 41 by fitting the discharge pipe holder 13d to the chamber portion 133 of the first block 41 with the sealing member 13c being interposed therebetween. The sealing member 13e is interposed between the discharge pipe holder 13d and a peripheral edge of an opening (not shown) provided in a bottom surface of the cyclone accommodation chamber 12.

Figure 6:
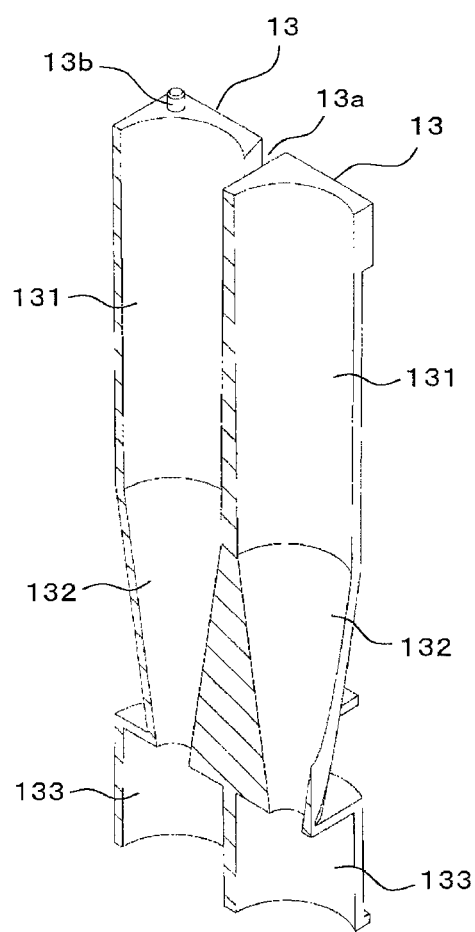
FIG. 6 is a partial sectional perspective view of the cyclone unit according to one or more embodiments of the present invention.

FIGS. 5A to 5D each show the first block 41 depicted in FIGS. 4A and 4B. FIG. 5A is a top view, FIG. 5B is a front view, FIG. 5C is a sectional view taken along line X-X indicated in FIG. 5B, and FIG. 5D is a sectional view taken along line Y-Y indicated in FIG. 5A. FIG. 6 is a perspective view corresponding to FIG. 5D.

Figure 7:
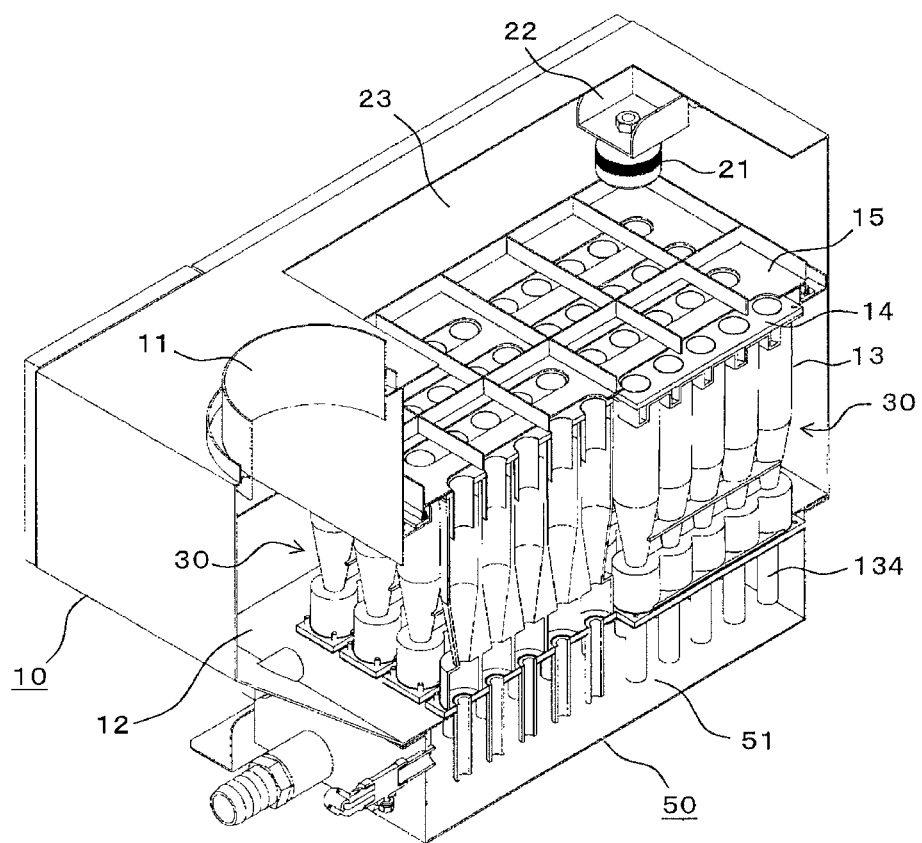
FIG. 7 is an enlarged perspective view of a cyclone accommodation chamber according to one or more embodiments of the present invention.

As shown in FIG. 7, the cyclone accommodation chamber 12 of the main body 10 accommodates a predetermined number of cyclone units 30 thus configured. In this state, the discharge pipes 134 project to the drain discharge chamber 51 and guide oil mist separated from an air flow in the cyclones 13 into the drain discharge chamber 51.

Figure 8:
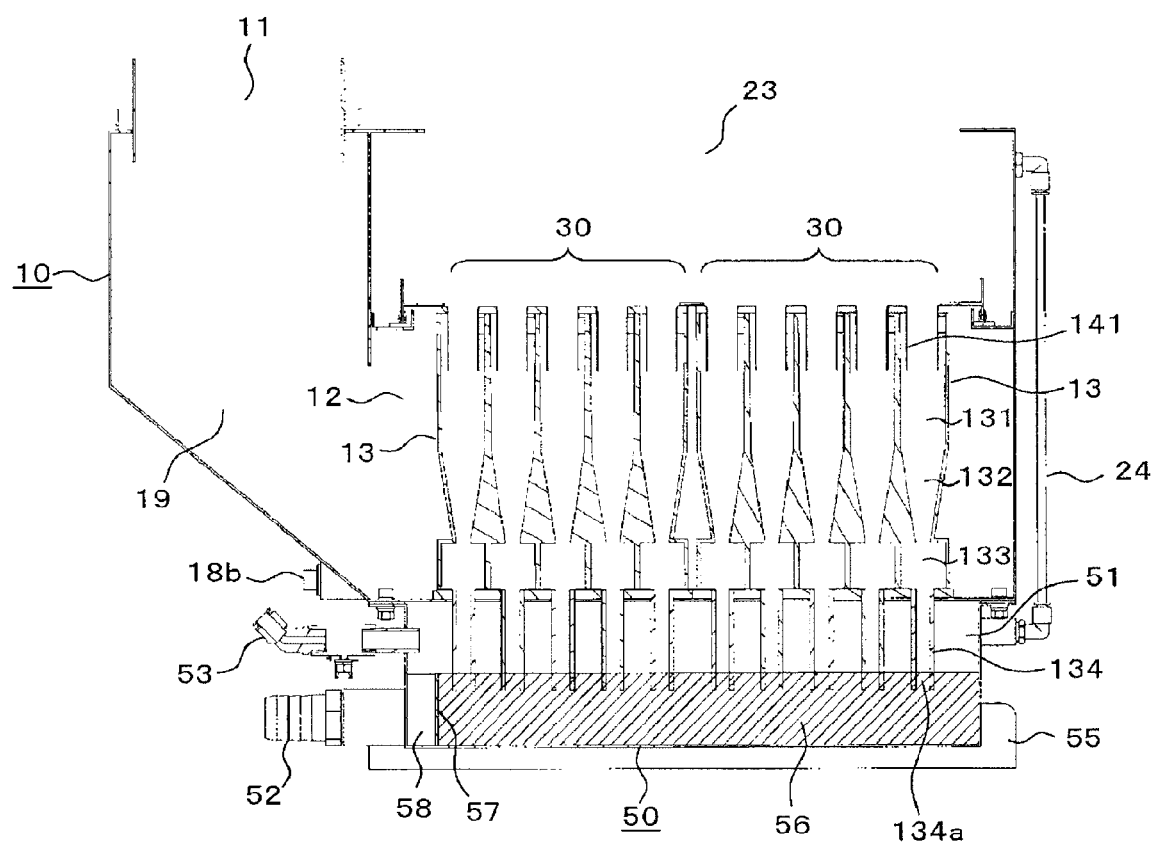
FIG. 8 is a sectional view showing a state of the oil mist collector prior to operation according to one or more embodiments of the present invention.

As shown in FIG. 8, the drain discharge chamber 51 stores liquid 56 (drain liquid) used for taking in and collecting oil mist discharged from the discharge pipes 134. Examples of the liquid 56 include water, water-soluble coolant, oil-based coolant, and cleaning solution. The liquid 56 has a liquid surface higher than lower ends of the discharge pipes 134, so that lower openings 134a of the discharge pipes 134 are sealed by the liquid 56. FIG. 8 shows a state where the oil mist collector 100 is not in operation.

The liquid 56 is discharged through a discharge port 54 (see FIG. 2) as necessary and is injected through the injection port 53 as necessary. In FIG. 8, the drain discharge chamber 51 is provided with a wall 57 keeping the liquid surface of the liquid 56 at certain height or less. The wall 57 has an upper end positioned higher than the lower ends of the discharge pipes 134. When the oil mist collector starts operation, the liquid surface is made lower than the upper end of the wall 57 because rotation of the fan in the exhaust unit 60 causes the inside of the cyclones 13 to have negative pressure and the liquid 56 is sucked into the discharge pipes 134. However, the drain discharge chamber 51 stores the liquid 56 of a sufficient amount so that the liquid surface is constantly higher than the lower ends of the discharge pipes 134.

The wall 57 blocks the liquid 56 until the liquid 56 overflows. When the liquid 56 is injected by a large amount and overflows, the liquid 56 having passed above the wall 57 flows into a space 58 adjacent to the wall 57. The space 58 is surrounded with the side walls of the collection tray 50 and the wall 57, and is in communication with the outside by way of the discharge port 52. Hence, the overflown liquid 56 is discharged through the discharge port 52 to the outside as appropriate. The liquid surface of the liquid 56 is thus kept at certain height (height of the wall 57) or less.

Figure 9:
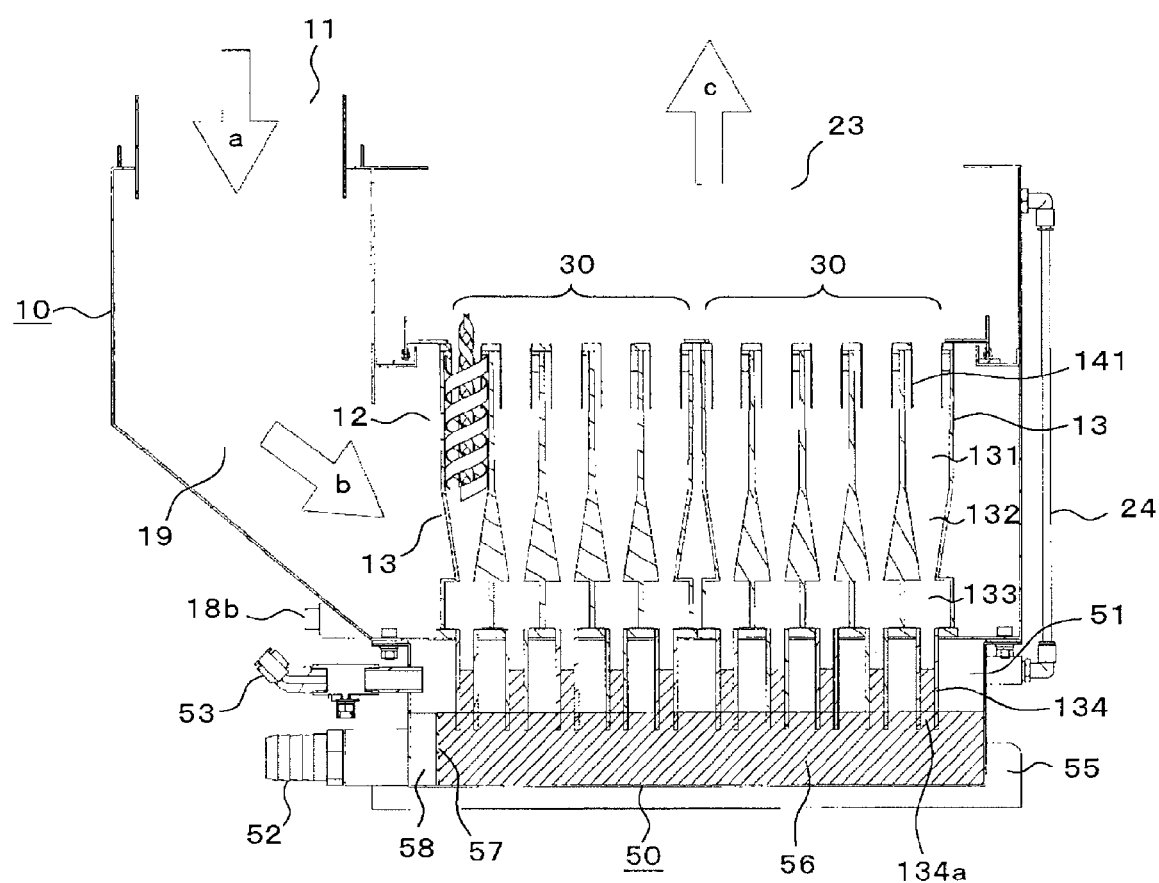
FIG. 9 is a sectional view showing a state of the oil mist collector in operation according to one or more embodiments of the present invention.

FIG. 9 shows a state where the oil mist collector 100 is in operation. When the oil mist collector starts operation, the fan in the exhaust unit 60 rotates to decrease pressure in the main body 10, so that an air flow is sucked into the suction port 11 as indicated by an arrow a. The air flow includes oil mist generated from a machine tool. The sucked air flow enters the cyclone accommodation chamber 12 by way of the air flow inlet portion 19 as indicated by an arrow b.

The air flow having entered the cyclone accommodation chamber 12 is taken in the cyclones 13 through the inlet ports 13a (see FIG. 4A) provided to the cyclones 13. As shown in the enlarged view of FIG. 10, the air flow taken in swirls to form a downward swirl flow Fd and travels in the swirling portion 131 of the cyclone 13. The swirl flow Fd applies centrifugal force to the oil mist in the air flow, so that the oil mist is separated from the air flow with the centrifugal force and is collected to the inner wall or the vicinity of the inner wall of the swirling portion 131.

The downward swirl flow Fd having travelled downward in the swirling portion 131 is reversed in the reversing portion 132 of the funnel shape into an upward swirl flow Fu. The swirl flow Fu, which is a purified air flow including no oil mist, is released into the cyclone exit chamber 23 through the exit pipe 141 of the cyclone 13. The purified air flow thus released is attracted to the fan (not shown) located above the cyclone exit chamber 23 as indicated by an arrow c in FIG. 9 when the fan is rotating, and is released to the outside through the exhaust port 61 (see FIG. 1).

As described above, the inside of the cyclone 13 has negative pressure when the oil mist collector 100 is in operation. Accordingly, as shown in FIG. 9, the liquid 56 is further sucked into the discharge pipes 134 and the liquid surfaces in the pipes rise. However, the liquid surface in the discharge pipe 134 does not reach the reversing portion 132 of each of the cyclones 13 because the communication pipe 24 substantially equalizes the pressure in the cyclone exit chamber 23 and the pressure in the drain discharge chamber 51. Details thereof are to be described later.

Meanwhile, the oil mist collected in the cyclone 13 leaves the reversing portion 132, passes through the chamber portion 133 and the discharge pipe 134, and is collected in the liquid 56 in the drain discharge chamber 51 so as to be discharged through the discharge port 54 along with the liquid 56.

As described above, a contaminated air flow including oil mist generated from a machine tool is transformed to a purified air flow including no oil mist by centrifugation in the cyclones 13 of the oil mist collector 100.

Figure 21:
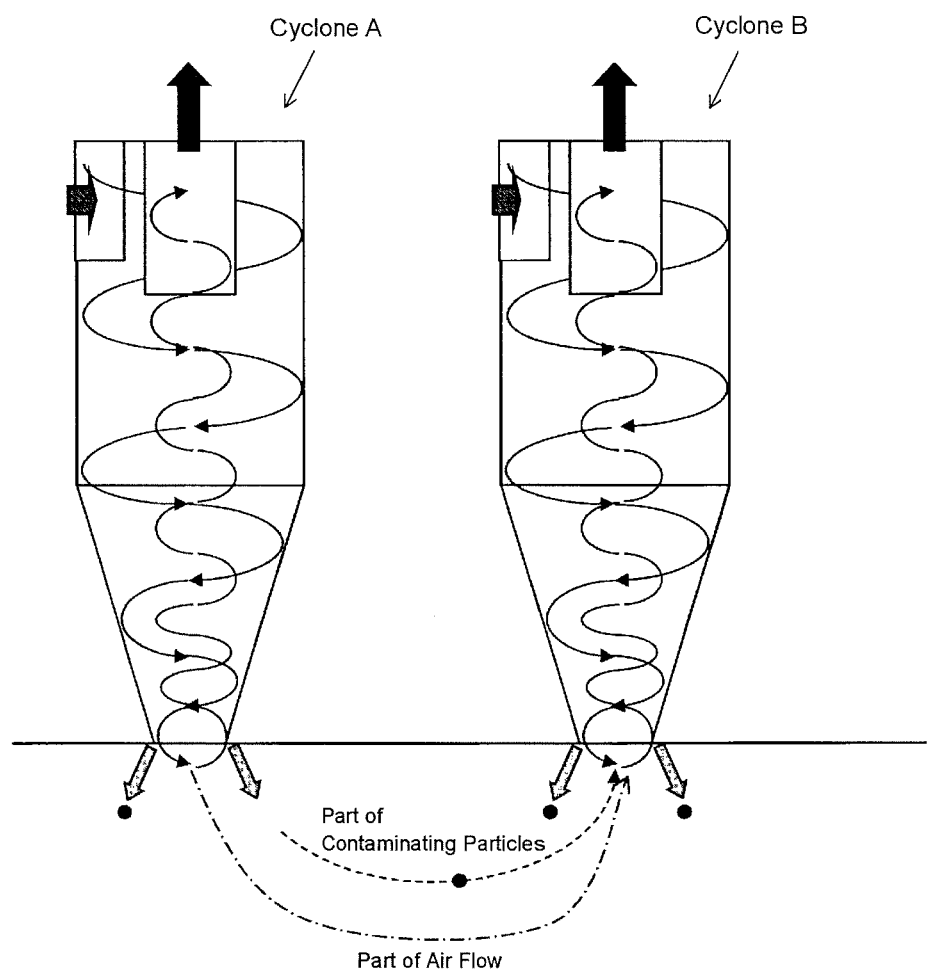
FIG. 21 is an explanatory schematic view of rescattering of contaminating particles according to one or more embodiments of the present invention.

Particularly in one or more embodiments, the liquid 56 seals the lower openings 134a of the discharge pipes 134 as described above (see FIGS. 8 and 9). In this configuration, even when the cyclones 13 are aligned together, an unintended flow as indicated in FIG. 21 is not caused and oil mist serving as contaminating particles will not rescatter. Consequently, provision of a large number of cyclones 13 each having a small cyclone radius achieves sufficient processed air volume as well as high collection efficiency due to prevention of rescattering of oil mist, while keeping high separation accuracy and collection efficiency of each of the cyclones.

The suction port 11 is actually connected with a duct (not shown) or the like. Hence, the negative pressure at the suction port 11 has a value varied depending on conditions of use. In a case where there is provided no liquid level control means, such variation in negative pressure causes variation in liquid level (height of the liquid surfaces) of the liquid 56 in the discharge pipes 134. More specifically, the liquid level of the liquid 56 rises if the negative pressure at the suction port 11 increases, whereas the liquid level of the liquid 56 falls if the negative pressure decreases.

Figure 11:
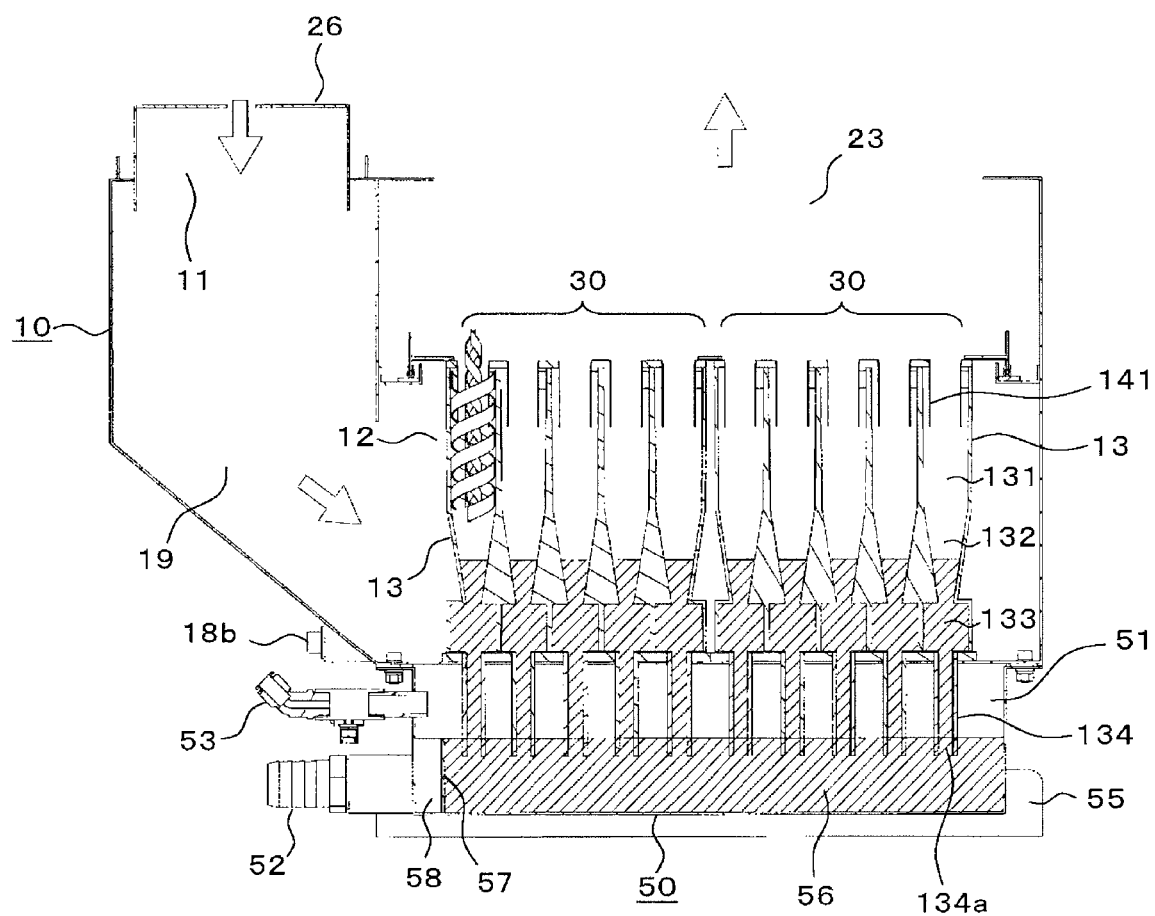
FIG. 11 is a sectional view of a state during operation in a case where no communication pipe is provided according to one or more embodiments of the present invention.

FIG. 11 shows a state where the liquid level of the liquid 56 in the discharge pipes 134 becomes high when the suction port 11 is covered with a lid 26 and has higher static pressure. In FIG. 11, there is provided no communication pipe 24 (see FIG. 9) serving as a liquid level control means, and the liquid surfaces in the discharge pipes 134 significantly rise to reach the reversing portions 132 while the apparatus is in operation.

When the liquid surfaces of the liquid 56 reach the reversing portions 132, there are caused defects such as deterioration in collection efficiency in the cyclones 13, scattering of the liquid 56 out of the exit pipes 141, decrease in air volume due to increase in pressure loss. In order to solve these defects, the discharge pipes 134 can be sufficiently increased in length in order to prevent the liquid surfaces from reaching the reversing portions 132. In this case, however, the collection tray 50 needs to be increased in height, which leads to increase in height of the apparatus and prevents decrease in size thereof.

In one or more embodiments, as shown in FIG. 9, there is provided the communication pipe 24 connecting the cyclone exit chamber 23 and the drain discharge chamber 51. The liquid level in the discharge pipes 134 is thus in proportion only to pressure loss at the cyclones 13, in other words, volume of air processed by the cyclones 13 (air volume of purified air flows released from the exit pipes 141). The liquid level in the discharge pipes 134 rises if the volume of air processed by the cyclones 13 increases, whereas the liquid level in the discharge pipes 134 falls if the volume of air processed by the cyclones 13 decreases.

Figure 10:
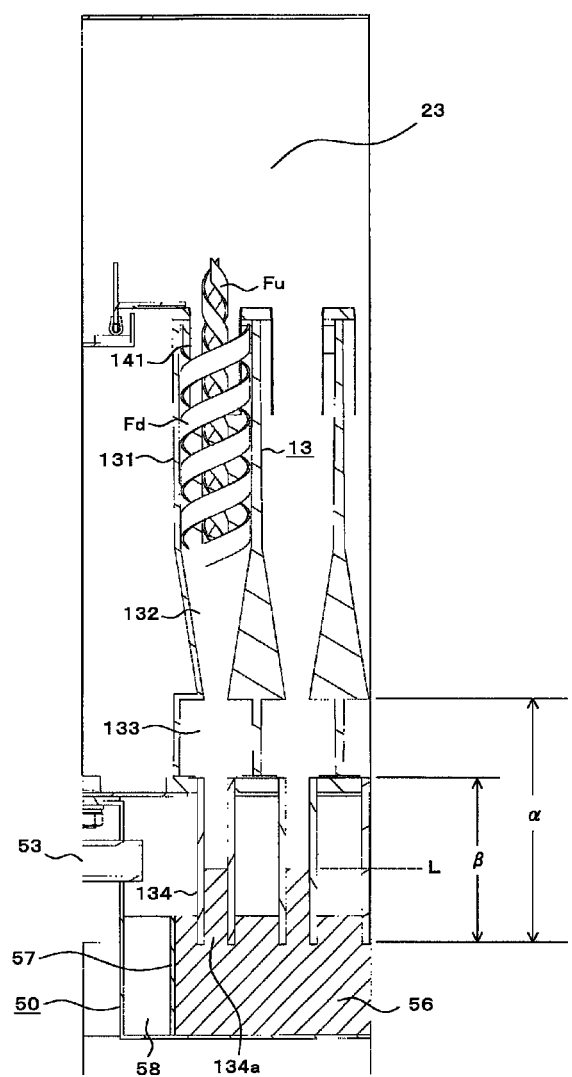
FIG. 10 is an enlarged sectional view of a cyclone according to one or more embodiments of the present invention.

Therefore, the length of the discharge pipes 134 can be determined so that the liquid surfaces in the discharge pipes 134 do not reach the reversing portions 132 when the air volume is the largest. In this case, as shown in FIG. 10, the apparatus can be designed such that liquid level L of the liquid 56 in the discharge pipe 134 is located within a range α from the lower end of the discharge pipe 134 to the lower end of the reversing portion 132. The liquid level L may have a variation range of β from the lower end to the upper end of the discharge pipe 134. This configuration also prevents the liquid 56 from entering the chamber portion 133.

The communication pipe 24 thus provided prevents the liquid 56 from reaching the reversing portion 132 with no need to increase in length of the discharge pipe 134. This minimizes the height of the apparatus and achieves reduction in size.

In one or more embodiments, as shown in FIGS. 4A and 4B, the cyclone unit 30 includes the plurality of cyclones and can be divided in the vertical direction V. Unlike a filter, a cyclone typically causes almost no clogging, but the inside thereof may be abraded with a swirl flow. On such an occasion, the cyclone needs maintenance or replacement. It is not easy to apply such work to a large number of cyclones. In contrast, according to one or more embodiments, the plurality of cyclones 13 can be detached by each unit for maintenance or replacement, thereby significantly facilitating the work. Furthermore, the cyclone unit 30 has the dividable structure. This enables replacement of each component in the unit (e.g. replacement of only the discharge pipe holder 13d).

Figure 12A:
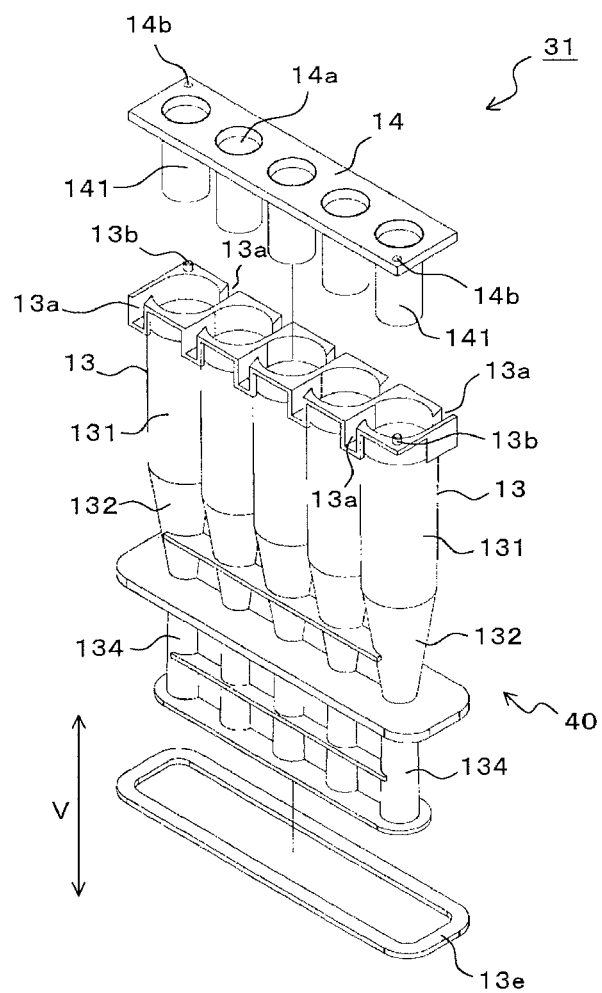
FIGS. 12A and 12B are perspective views of a cyclone unit according to one or more embodiments of the present invention.
Figure 12B:
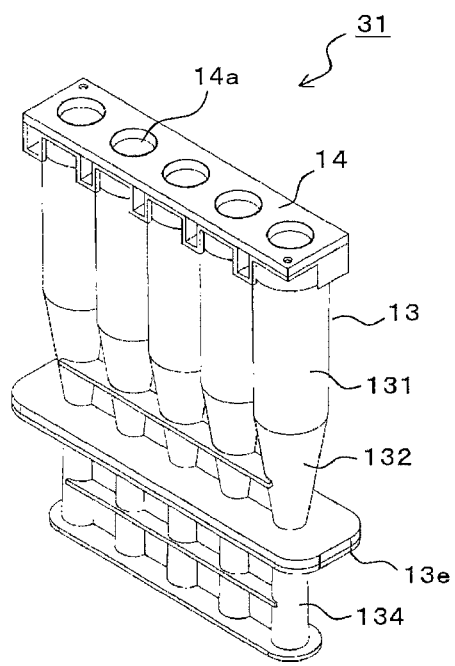

FIGS. 12A and 12B each depict a cyclone unit according to one or more embodiments of the present invention. A cyclone unit 31 is not provided with the chamber portions 133, the sealing member 13c, and the discharge pipe holder 13d depicted in FIGS. 4A and 4B. Furthermore, the discharge pipes 134 are integrally coupled to the reversing portions 132, respectively, so as to form a single cyclone block 40.

Figure 13:
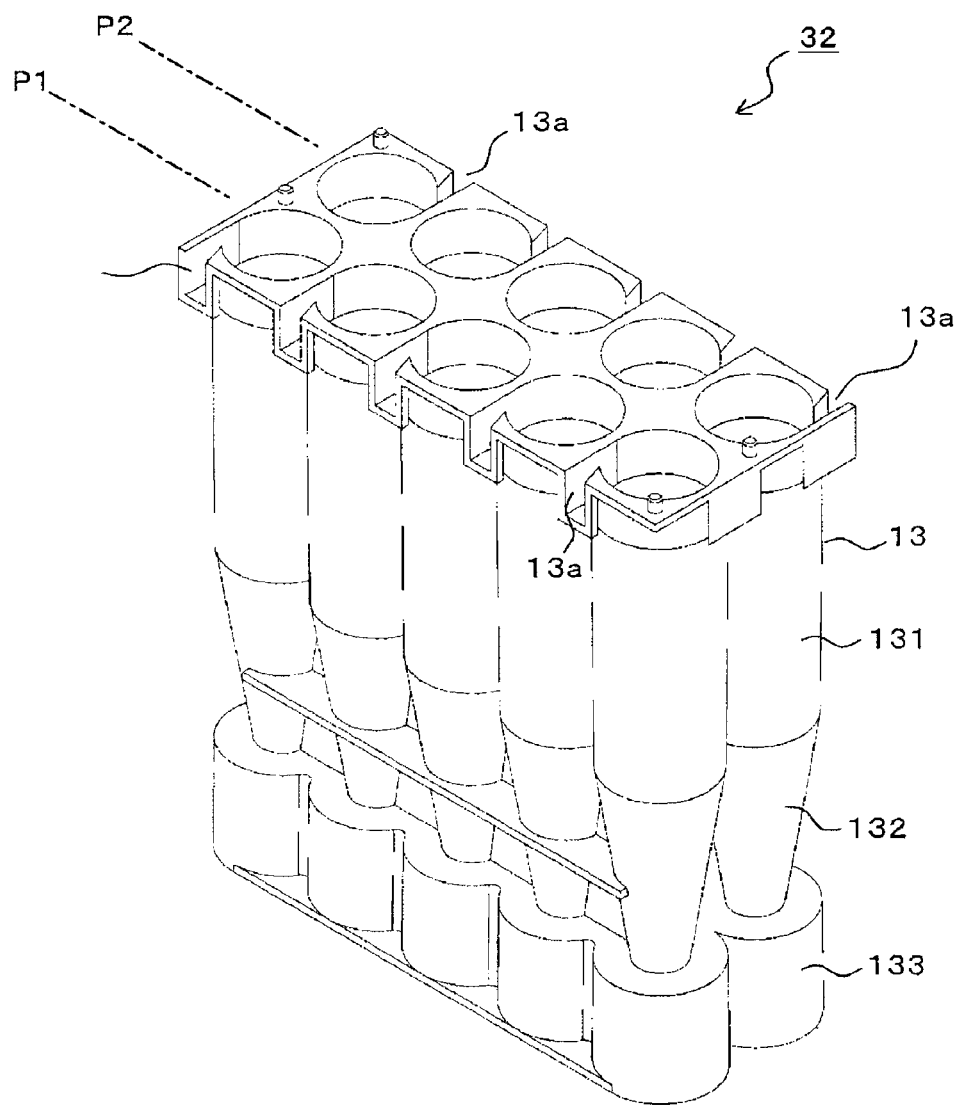
FIG. 13 is a perspective view of a cyclone unit according to one or more embodiments of the present invention.

FIG. 13 depicts a cyclone unit according to one or more embodiments of the present invention. A cyclone unit 32 includes a plurality of cyclones 13 that are integrally provided so as to form two rows (a raw P1 and a raw P2). In this case, each of the cyclones 13 is provided with only one inlet port 13a. It is noted that FIG. 13 does not depict the exit pipe holder 14 and the discharge pipes 134.

FIGS. 14A and 14B each depict a cyclone unit according to one or more embodiments of the present invention. A cyclone unit 33 is configured by coupling a plurality of cyclone pieces 13' each of which has four halved cyclones as depicted in FIG. 14B, and is dividable in a horizontal direction H. Each of the cyclone pieces 13' includes swirling portions 231, reversing portions 232, chamber portions 233, and discharge pipes 234, and is also provided with a bolt hole 235 and a rib 236. Although not shown, there is provided a concave portion in a surface (rear surface) opposite to a surface provided with the rib 236. The rib 236 of another cyclone piece 13' to be coupled together is fitted into the concave portion. The plurality of cyclone pieces 13' are coupled together by fitting the rib 236 into the concave portion and tightening a bolt (not shown) penetrating the bolt holes 235. The cyclone pieces 13' can be coupled to each other with an adhesive agent instead of the bolt. As shown in FIG. 14A, inlet ports 13a' are formed in the state where the plurality of cyclone pieces 13' are coupled to each other.

FIGS. 15A and 15B each depict a cyclone unit according to one or more embodiments of the present invention. A cyclone unit 34 is configured by coupling a plurality of cyclone pieces 13" each of which has two halved cyclones as depicted in FIG. 15B, and is dividable in the horizontal direction H similarly to that shown in FIG. 14A. The plurality of cyclone pieces 13" are coupled to each other with an adhesive agent or the like. As shown in FIG. 15A, inlet ports 13a" are formed in the state where the plurality of cyclone pieces 13" are coupled to each other.

Figure 16:
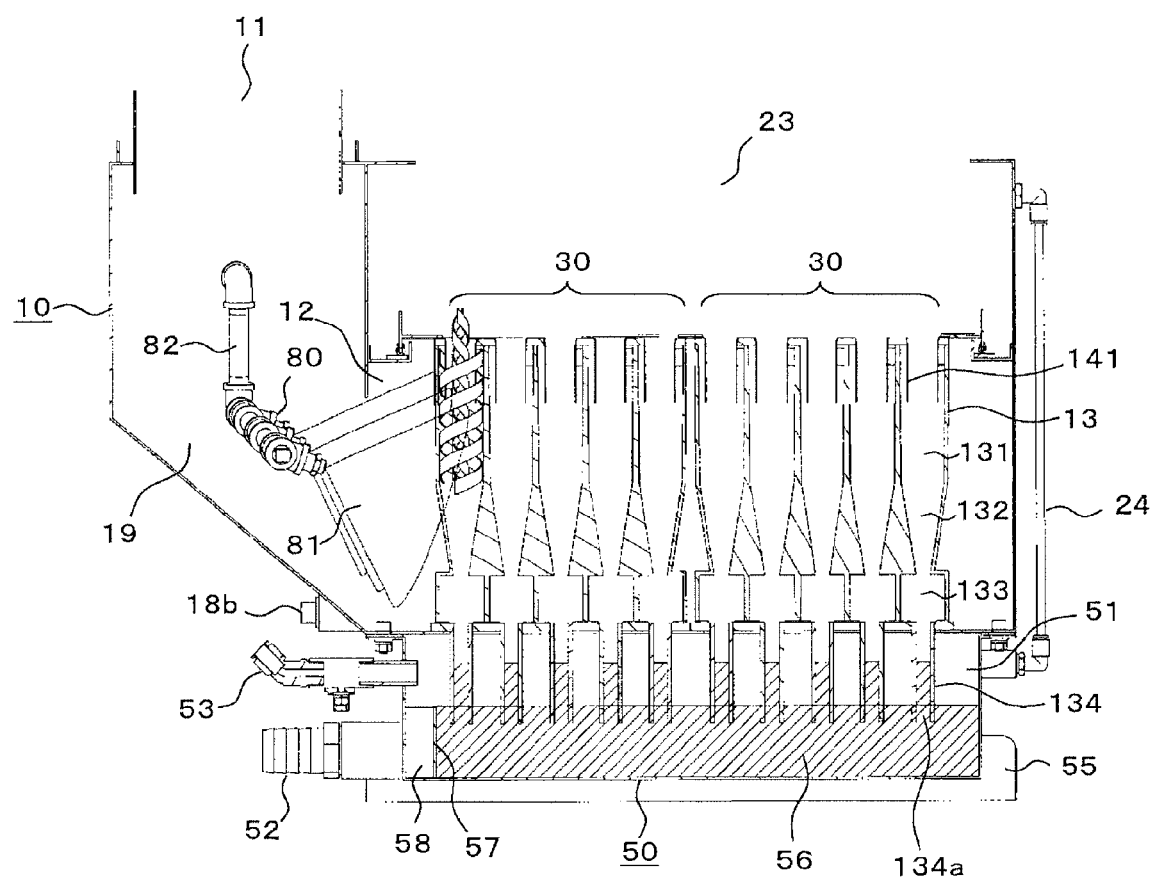
FIG. 16 is a side sectional view of an oil mist collector according to one or more embodiments of the present invention.

FIG. 16 depicts an oil mist collector according to one or more embodiments of the present invention. This figure does not depict the exhaust unit 60 (see FIG. 3). According to one or more embodiments, the main body 10 is provided therein with a cleaning nozzle 80 serving as a cleaning means. The cleaning nozzle 80 jets cleaning solution 81 toward the cyclone accommodation chamber 12 and cleans the cyclones 13. Other configurations are similar to those according to the above-described embodiments and are not thus described redundantly.

There are provided a plurality of cleaning nozzles 80 correspondingly to the rows of the cyclones 13 (the cyclone units 30). The cleaning nozzles 80 each jet the cleaning solution 81 supplied through a pipe 82 toward the cyclones 13 in corresponding one of the rows. The cleaning solution 81 jetted while the apparatus is not in operation cleans the outsides of the cyclones 13.

Figure 17:
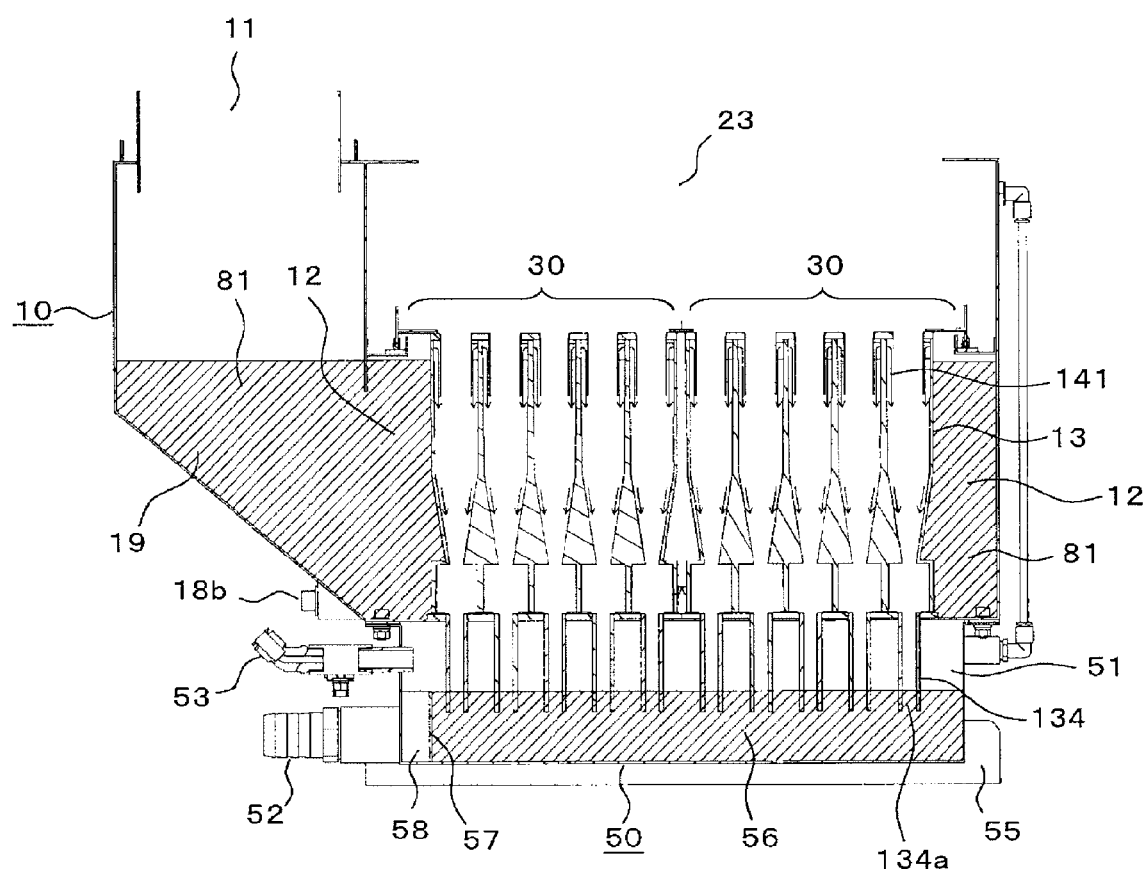
FIG. 17 is a side sectional view of an oil mist collector according to one or more embodiments of the present invention.

When the discharge port 18a (see FIG. 1) provided in the side portion of the cyclone accommodation chamber 12 is opened, the cleaning solution 81 cleans a reachable range. When the discharge port 18a is closed, the cleaning solution 81 is injected into the cyclone accommodation chamber 12 so that the cyclone accommodation chamber 12 is filled with the cleaning solution 81 as shown in FIG. 17. If the liquid surface of the cleaning solution 81 reaches the inlet ports 13a (see FIG. 4A) of the cyclones 13, the cleaning solution 81 flows downward in the cyclones 13 and reaches the drain discharge chamber 51 so as to be discharged through the discharge port 52. When the cleaning solution 81 is stored in the cyclone accommodation chamber 12, the cleaning solution 81 can be supplied through the liquid discharge port 18b instead of from the cleaning nozzle 80.

In the case where the cleaning nozzle 80 jets the cleaning solution 81 while the apparatus is in operation, the cyclones 13 take the jetted cleaning solution 81 therein along with an air flow through the suction port 11. In this case, the cleaning solution cleans both the outsides and the insides of the cyclones 13. The cleaning solution 81 can be jetted manually or under automatic control. The latter case can save time for daily maintenance work.

Figure 18:
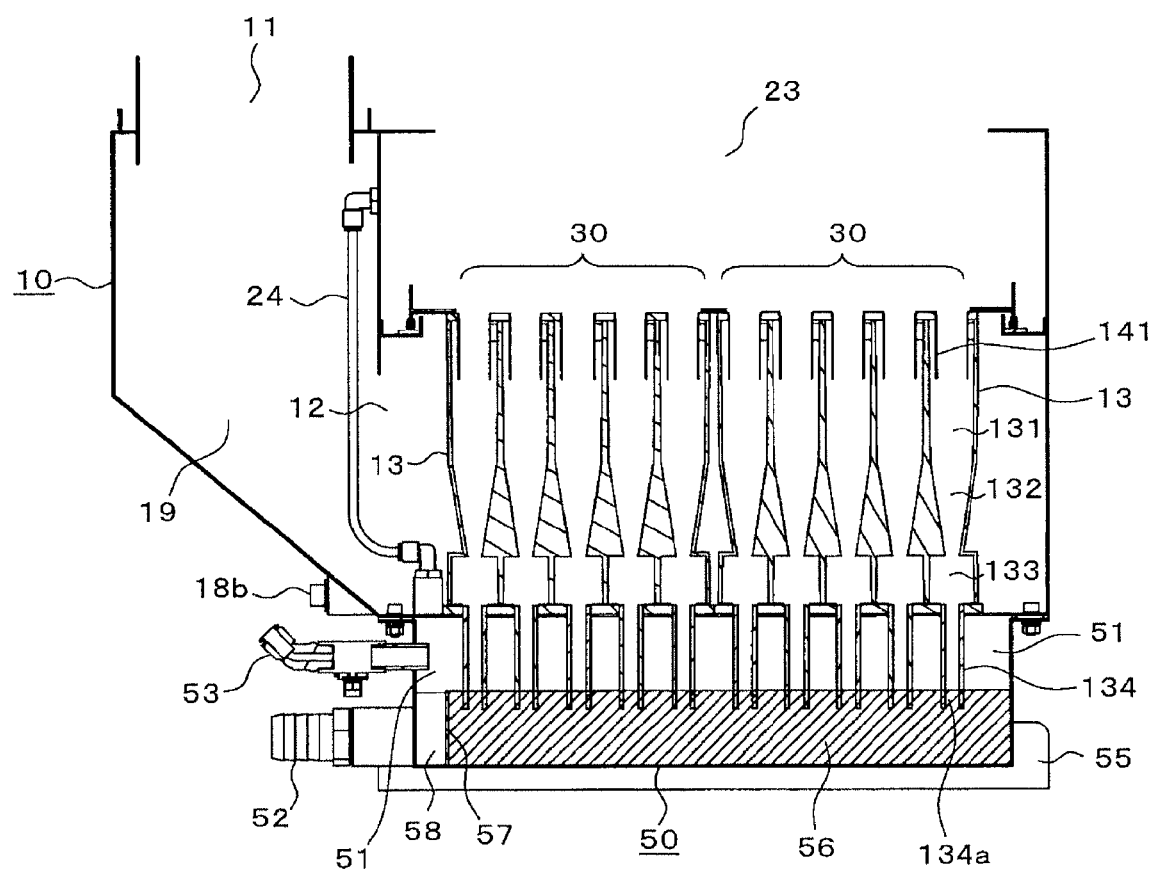
FIG. 18 is a side sectional view of an oil mist collector according to one or more embodiments of the present invention.

FIG. 18 illustrates one or more embodiments of the present invention. According to previous embodiments (FIG. 8 etc.), the communication pipe 24 is provided outside the main body 10. In contrast, according to the embodiment illustrated in FIG. 18, the communication pipe 24 is provided inside the main body 10. Similarly to the previous embodiments, the communication pipe 24 connects the drain discharge chamber 51 and the cyclone exit chamber 23. Provision of the communication pipe 24 inside the main body 10 in this manner enables reduction in outer size of the oil mist collector 100.

According to one or more embodiments described above, the communication pipe 24 controls the liquid level of the liquid 56 so that the liquid 56 in the discharge pipes 134 does not reach the reversing portions 132. There can be alternatively adopted a liquid level control means other than the communication pipe. For example, a sensor (not shown) for detecting upper limit liquid level in the discharge pipe 134 can be provided so that the liquid 56 in the drain discharge chamber 51 can be discharged if the sensor detects the upper limit liquid level.

Figure 19:
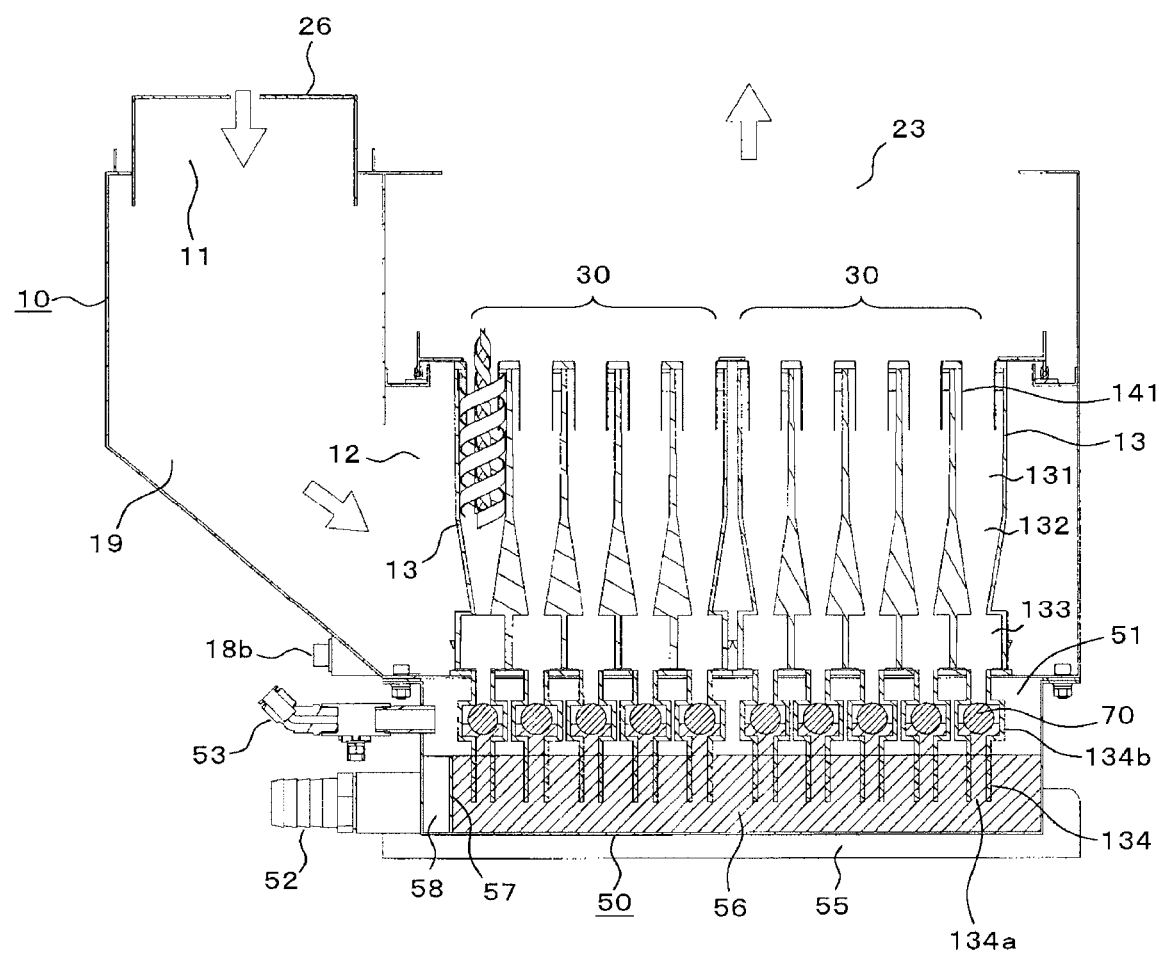
FIG. 19 is a side sectional view of an oil mist collector according to one or more embodiments of the present invention.
Figure 20:
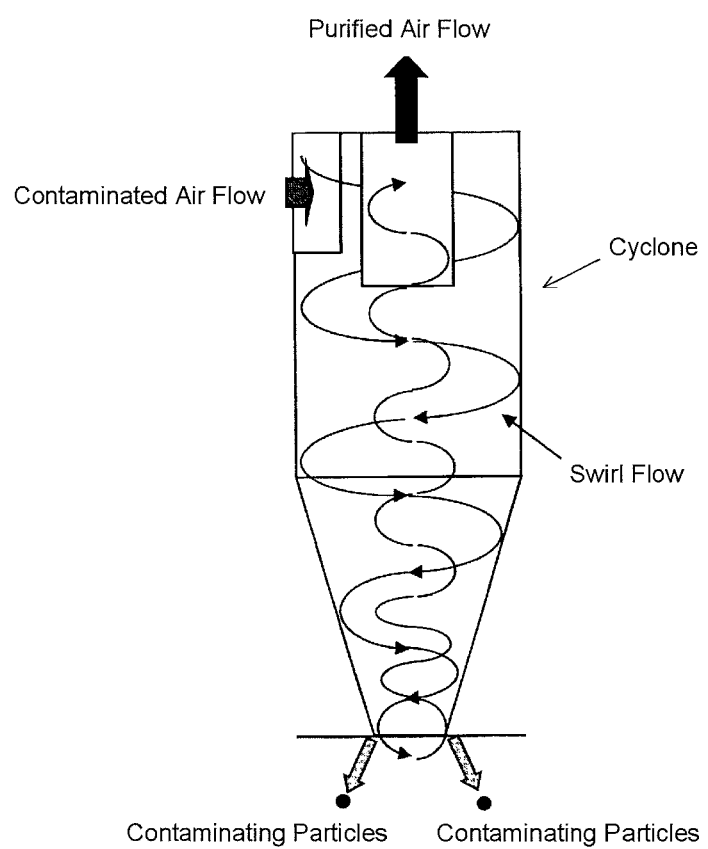
FIG. 20 is an explanatory schematic view of motion in a cyclone according to one or more embodiments of the present invention.

The liquid level control means can have a still alternative structure shown in FIG. 19. In FIG. 19, each of the discharge pipes 134 is provided halfway with a sphere accommodation chamber 134b that is larger in diameter than the discharge pipes 134. The sphere accommodation chamber 134b accommodates a sphere 70 that can flow on the liquid 56. The sphere 70 has a diameter larger than the inner diameter of the discharge pipe 134 and smaller than the inner diameter of the sphere accommodation chamber 134*b*. Furthermore, the sphere 70 can move upward and downward in the sphere accommodation chamber 134*b*.

When the apparatus is in operation, the sphere 70 is made in contact with a top of the sphere accommodation chamber 134*b* due to buoyancy by the liquid 56 sucked from the lower end of the discharge pipe 134, so that the discharge pipe 134 is closed as shown in FIG. 19. This prevents the liquid 56 from reaching the chamber portion 133 or the reversing portion 132. If oil mist separated from an air flow is stored in a portion above the sphere accommodation chamber 134*b* of the discharge pipe 134, the sphere 70 moves away from the top of the sphere accommodation chamber 134*b* due to the weight of the oil mist, so that the discharge pipe 134 is not closed any more. The oil mist separated from the air flow thus flows downward in the discharge pipe 134 and is discharged into the drain discharge chamber 51. Furthermore, upon cleaning, if the cleaning solution is stored in the portion above the sphere accommodation chamber 134*b* of the discharge pipe 134, the sphere 70 similarly moves away from the top of the sphere accommodation chamber 134*b* due to the weight of the cleaning solution, so that the discharge pipe 134 is not closed any more. The cleaning solution flows downward in the discharge pipe 134 and is discharged into the drain discharge chamber 51.

The embodiments having been described exemplify cases where each of the cyclones 13 is provided with one or two inlet ports 13*a*. The number of the inlet ports 13*a* can be appropriately selected in accordance with required air volume. Increase in number of the inlet ports 13*a* increases the processable air volume on the one hand, but increases resistance at the exit pipe 141 on the other hand. The latter requires increase in output of a motor for driving the fan. In actual cases, the number of the inlet ports 13*a* may be selected in the range of one to four.

Furthermore, the inlet port 13*a* is not limited to those of the embodiments in terms of its shape, but can have any one of various shapes. For example, the inlet port can be of a tangential flowing type for sucking an air flow in a tangential direction, or can be provided with a guide blade.

One or more of the embodiments described above exemplify the oil mist collector as the multi-cyclone collector. One or more embodiments of the present invention are widely applicable to apparatuses for separating contaminating particles such as dust, not limited to oil mist, from an air flow to collect the contaminating particles.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

REFERENCE SIGNS LIST

10 main body
11 suction port
12 cyclone accommodation chamber
13 cyclone
23 cyclone exit chamber
24 communication pipe (liquid level control means)
30, 31, 32, 33, 34 cyclone unit
50 collection tray
51 drain discharge chamber
54 discharge port
57 wall
60 exhaust unit
80 cleaning nozzle
81 cleaning solution
100 oil mist collector (multi-cyclone collector)
131 swirling portion
132 reversing portion
134 discharge pipe
134*a* lower opening
L liquid level

The invention claimed is:

1. A multi-cyclone collector comprising:
 a suction port for sucking an air flow including contaminating particles;
 a cyclone accommodation chamber allowing the air flow sucked through the suction port to be guided thereinto;
 a plurality of cyclones each accommodated in the cyclone accommodation chamber, for transforming the air flow taken in to a downward swirl flow, separating the contaminating particles, then reversing the swirl flow to the upward swirl flow and releasing the upward swirl flow as a purified air flow;
 a cyclone exit chamber provided above the cyclone accommodation chamber, that allows the purified air flow from the cyclones to be guided thereinto; and
 a drain discharge chamber provided below the cyclone accommodation chamber, for collecting the contaminating particles separated by the cyclones, wherein
 each of the cyclones has a swirling portion allowing the downward swirl flow to travel therethrough, a reversing portion for reversing the swirl flow to the upward swirl flow, and a discharge pipe for guiding the contaminating particles separated from the air flow into the drain discharge chamber,
 the discharge pipe has a lower opening sealed by liquid stored in the drain discharge chamber,
 the multi-cyclone collector further comprises a liquid level control means for controlling liquid level of the liquid so that the liquid in the discharge pipe does not reach the reversing portion, and the liquid level control means is a communication pipe connecting the cyclone exit chamber and the drain discharge chamber.

2. The multi-cyclone collector according to claim 1, wherein
 the drain discharge chamber is provided with a wall blocking the liquid until the liquid overflows, and a discharge port for discharging the liquid overflown the wall.

3. The multi-cyclone collector according to claim 2, wherein
 the plurality of cyclones configure a cyclone unit that is an aggregate of the cyclones and is dividable, and
 the cyclone accommodation chamber accommodates a predetermined number of the cyclone units.

4. The multi-cyclone collector according to claim 2, the multi-cyclone collector further comprising:
 a cleaning means for supplying the cyclone accommodation chamber with cleaning solution and cleaning the cyclones.

5. The multi-cyclone collector according to claim 1, the multi-cyclone collector further comprising:
 a cleaning means for supplying the cyclone accommodation chamber with cleaning solution and cleaning the cyclones.

6. The multi-cyclone collector according to claim 5, wherein
 the cleaning means includes a cleaning nozzle, and jets the cleaning solution from the cleaning nozzle toward the cyclone accommodation chamber to clean the cyclones.

7. The multi-cyclone collector according to claim 5, wherein
the cleaning means injects the cleaning solution into the cyclone accommodation chamber and fills the cyclone accommodation chamber with the cleaning solution to clean the cyclones.

8. The multi-cyclone collector according to claim 1, wherein
the plurality of cyclones configure a cyclone unit that is an aggregate of the cyclones and is dividable, and
the cyclone accommodation chamber accommodates a predetermined number of the cyclone units.

9. The multi-cyclone collector according to claim 8, wherein
the cyclone units are each dividable in a vertical direction.

10. The multi-cyclone collector according to claim 9, the multi-cyclone collector further comprising:
a cleaning means for supplying the cyclone accommodation chamber with cleaning solution and cleaning the cyclones.

11. The multi-cyclone collector according to claim 8, wherein
the cyclone units are each dividable in a horizontal direction.

12. The multi-cyclone collector according to claim 11, the multi-cyclone collector further comprising:
a cleaning means for supplying the cyclone accommodation chamber with cleaning solution and cleaning the cyclones.

13. The multi-cyclone collector according to claim 8, the multi-cyclone collector further comprising:
a cleaning means for supplying the cyclone accommodation chamber with cleaning solution and cleaning the cyclones.

* * * * *